United States Patent
Chu et al.

(10) Patent No.: US 11,673,833 B2
(45) Date of Patent: Jun. 13, 2023

(54) STRONTIUM FERRITE-BASED SACRIFICIAL MORTAR AND ITS PREPARATION METHOD

(71) Applicant: Nanjing Forestry University, Nanjing (CN)

(72) Inventors: Hongyan Chu, Nanjing (CN); Jinyang Jiang, Nanjing (CN); Huan Zhao, Nanjing (CN); Li Gao, Nanjing (CN); Jianjian Qin, Nanjing (CN); Jinhui Tang, Nanjing (CN); Fengjuan Wang, Nanjing (CN); Kaijian Huang, Nanjing (CN)

(73) Assignee: NANJING FORESTRY UNIVERSITY, Nanjing (CN)

( * ) Notice: Subject to any disclaimer, the term of this patent is extended or adjusted under 35 U.S.C. 154(b) by 276 days.

(21) Appl. No.: 17/196,108

(22) Filed: Mar. 9, 2021

(65) Prior Publication Data
US 2022/0162121 A1    May 26, 2022

(30) Foreign Application Priority Data
Nov. 25, 2020    (CN) .......................... 202011342409.3

(51) Int. Cl.

| | |
|---|---|
| *C04B 14/30* | (2006.01) |
| *C04B 14/06* | (2006.01) |
| *C04B 24/26* | (2006.01) |
| *C04B 28/06* | (2006.01) |
| *C04B 40/00* | (2006.01) |
| C04B 103/32 | (2006.01) |
| C04B 111/00 | (2006.01) |

(52) U.S. Cl.
CPC ............ *C04B 14/308* (2013.01); *C04B 14/06* (2013.01); *C04B 24/2641* (2013.01); *C04B 28/065* (2013.01); *C04B 40/0046* (2013.01); C04B 2103/32 (2013.01); C04B 2111/00862 (2013.01)

(58) Field of Classification Search
CPC . C04B 14/308; C04B 28/065; C04B 2103/32; C04B 24/2641; C04B 40/0046; C04B 14/06
USPC ............................................................ 524/8
See application file for complete search history.

(56) References Cited

FOREIGN PATENT DOCUMENTS

| CN | 102344269 A | 2/2012 |
|---|---|---|
| CN | 108751868 A | 11/2018 |
| WO | 2014025136 A1 | 2/2014 |

OTHER PUBLICATIONS

Kovlev et al., Journal of Nuclear Materials, 467, 778-784, 2015. (Year: 2015).*
Komlev et al. "New sacrificial material for ex-vessel core catcher" Journal of Nuclear Materials 467 (2015) 778-784.

* cited by examiner

*Primary Examiner* — Hui H Chin
(74) *Attorney, Agent, or Firm* — WPAT, P.C

(57) ABSTRACT

The invention discloses a strontium ferrite-based sacrificial mortar and its preparation method, the strontium ferrite-based sacrificial mortar mainly comprises 720-1000 parts of sulphoaluminate cement, 100-300 parts of strontium ferrite, 600-650 parts of quartz sand, 400-450 parts of water and 0.01-35 parts of superplasticizer. The preparation process is simple, and the strontium ferrite-based sacrificial mortar can be prepared by using a conventional forced single horizontal shaft concrete mixer. The obtained mortar has excellent working performance, compressive strength and corrosion resistance. It can be used in the current third and future fourth generation nuclear power plant core catchers, and has obvious engineering application value.

3 Claims, No Drawings

STRONTIUM FERRITE-BASED SACRIFICIAL MORTAR AND ITS PREPARATION METHOD

FIELD OF THE INVENTION

The invention relates to the technical field of nuclear power materials, especially refers to a strontium ferrite-based sacrificial mortar and its preparation method.

BACKGROUND OF THE INVENTION

In order to alleviate the serious consequences of nuclear power plant accidents, in the third generation nuclear power technology, the core melt is generally collected, cooled and solidified by the core catchers. When there is a serious nuclear power accident, the sacrificial material in the core catcher interacts with the core melt, the temperature of the core melt is high (about 3000-4000° C.), which is enough to erode the cement-based sacrificial materials with a melting temperature of only 1100° C. Once the sacrificial materials of the core catcher are exhausted, the extremely high temperature core melt will continue to erode the bottom plate of the containment. If the bottom plate of the containment is melted through, the integrity of the containment will be lost, and radioactive materials will leak, resulting in serious nuclear power accidents. Therefore, the key to reduce catastrophic accidents in nuclear power plants is the cooling and solidification technology of core melt. Sacrificial material is the key component of core catcher, and it also plays a decisive role in the cooling and solidification reaction of core melt. At present, scholars from China and all around the world disclosed some preparation technologies related to sacrificial materials. Generally speaking, the sacrificial materials prepared at present can not meet the requirements of core melt cooling and solidification. Strontium ferrite is a permanent magnetic material with excellent magnetism, due to the similarity in time between the decomposition temperature of strontium ferrite and the activation temperature of the interaction between core melt and sacrificial material, the strontium ferrite has better effect in cooling and curing core melt.

Strontium ferrite-based sacrificial paste is a mixture of cement, water and strontium ferrite, which has good working performance, but the cement consumption is large and the cost is high. Compared with paste, the addition of fine aggregate in mortar can reduce the amount of cement, thus reducing the production cost. Furthermore, if the fine aggregate used is quartz sand, on the one hand, the quartz will undergo crystal transformation under the action of high temperature, which can absorb a certain amount of heat, thus improving the efficiency of cooling core melt. On the other hand, the quartz will become glassy at high temperature, which can encapsulate radioactive materials in the core melt, thus reducing the risk of radioactive material leakage. However, there is no report on the preparation of sacrificial mortar with strontium ferrite.

SUMMARY OF THE INVENTION

Purpose of the invention: In order to solve the problems in the existing technologies, the purpose of the invention is to offer a strontium ferrite-based sacrificial mortar and its preparation method.

Technical scheme: In order to achieve the above purpose, the invention discloses a strontium ferrite-based sacrificial mortar and its preparation method, the material is mainly prepared from the following raw materials in parts by weight:

720-1000 parts of sulphoaluminate cement, 100-300 parts of strontium ferrite, 600-650 parts of quartz sand, 400-450 parts of water and 0.01-35 parts of superplasticizer.

The 42.5 grade sulphoaluminate cement is used, in which CaO content is higher than 40% and $Al_2O_3$ content is higher than 20%.

The strontium ferrite is in powder form, wherein the content of $SrFe_{12}O_{19}$ is not less than 95%.

The quartz sand is high quality quartz powder, its $SiO_2$ content is not less than 99%, and its particle size distribution is 0.075-4.75 mm.

The water is tap water or drinking water which meets the requirements of Water Standard for Concrete (JGJ 63-2006).

The polycarboxylate superplasticizer is used, in which with colorless to light yellow appearance, density of 1.05-1.15 g/ml. Specifically, solid content is not less than 40% (by mass percentage), gas content is 6-8% (by volume), pH value is 6-8, and water reducing rate is not less than 33%.

The preparation method of the strontium ferrite-based sacrificial mortar, including:

(1) Taking 42.5 grade sulphoaluminate cement, strontium ferrite powder and quartz sand, and mixing uniformly in dry condition to obtain a mixed material M1.

(2) Adding a mixed solution of water and superplasticizer into the uniformly mixed material M1, and stirring to obtain a uniformly mixed material M2, thus obtaining the strontium ferrite-based sacrificial mortar.

In step (1), adding various raw materials used for mixing into a forced single horizontal shaft concrete mixer, wherein the mixing speed is selected to be 40-50 revolutions per minute and the mixing time is selected to be 200-240 seconds.

In step (2), first, ½ water is mixed with all the superplasticizer, then the evenly mixed solution is added into the mixed material M1, then the container containing the superplasticizer is cleaned with the remaining water, and then the water is added into the mixed material M1 after cleaning, and the mixing time is 200-240 seconds.

Comparing with the existing technologies, the strontium ferrite-based sacrificial mortar prepared by the invention has very good working performance, and the slump flow of the strontium ferrite-based sacrificial mortar is greater than 245 mm, thus meeting the requirement of self-compacting fluidity. Its compressive strength is greater than 37 MPa, which is improved by more than 23% compared with the requirements of the existing technologies. Comparing with the existing technologies, its decomposition enthalpy is improved by more than 15%, which can greatly reduce the erosion rate of sacrificial materials and improve the safety of nuclear power plants.

Technical effects: The preparation process is simple, and the strontium ferrite-based sacrificial mortar can be prepared by using a conventional forced single horizontal shaft concrete mixer. The strontium ferrite-based sacrificial mortar prepared by the invention has very good working performance and it can greatly improve the engineering construction efficiency. The compressive strength of the material has been greatly improved, which can improve its durability and prolong its service life. The decomposition enthalpy of the material is significantly improved, which leads to a significant decrease in the corrosion rate and an improvement in corrosion resistance, thus improving the safety of nuclear power plants. Therefore, the method has obvious engineering application value.

DESCRIPTION OF THE INVENTION

The present invention will be further illustrated with specific embodiments. It should be understood that these embodiments are only used to illustrate the present invention and not to limit the scope of the present invention. After reading the present invention, various modifications or equivalent forms made by those technicians in the technical field should be under the protection scope defined by the appended claims of this application. In addition, the advantages of the present invention are emphasized by comparing the experimental results of the embodiments.

The raw materials used in the following embodiments meet the following requirements:

The 42.5 grade sulphoaluminate cement is used, in which CaO content is 42.6% and $Al_2O_3$ content is 22.5%.

The content of $SrFei_{12}O_{19}$ in the strontium ferrite powder is 96.3%.

The quartz sand is high quality quartz powder, its $SiO_2$ content is 99.3%, and its particle size distribution is 0.075-4.75 mm.

The water is tap water.

The polycarboxylate superplasticizer is used, which with colorless to light yellow appearance, density of 1.10 g/ml. Specifically, solid content is 41.2% (by mass percentage), gas content is 7% (by volume), pH value is 7.2, and water reducing rate is 33.5%.

Embodiment 1

A strontium ferrite-based sacrificial mortar comprises the following components in parts by weight:

900 parts of sulphoaluminate cement, 100 parts of strontium ferrite, 600 parts of quartz sand, 400 parts of water and 0.30 parts of superplasticizer.

Preparation Method:

(1) Weighing required materials, including sulphoaluminate cement, strontium ferrite powder, quartz sand, tap water and superplasticizer.

(2) Wetting mixer and all necessary tools and moulds with water.

(3) The weighed sulphoaluminate cement, strontium ferrite powder and quartz sand are added to the forced single horizontal shaft concrete mixer in turn. The mixing speed is 45 revolutions per minute and the mixing time is 200 seconds. The mixed material M1 is obtained by mixing evenly.

(4) First, ½ of water is mixed with all the superplasticizer, and then the mixed solution is added into the mixture M1. Then the remaining water is used to clean the container containing the superplasticizer. After cleaning, the remaining water is added to the mixture M1. After 200 seconds of mixing, the mixture M2 is obtained, and then the molding and curing are carried out according to Chinese national standards.

Embodiment 2

A strontium ferrite-based sacrificial mortar comprises the following components in parts by weight:

800 parts of sulphoaluminate cement, 200 parts of strontium ferrite, 600 parts of quartz sand, 400 parts of water and 1.0 parts of superplasticizer.

Preparation Method:

(1) Weighing required materials, including sulphoaluminate cement, strontium ferrite powder, quartz sand, tap water and superplasticizer.

(2) Wetting mixer and all necessary tools and moulds with water.

(3) The weighed sulphoaluminate cement, strontium ferrite powder and quartz sand are added to the forced single horizontal shaft concrete mixer in turn. The mixing speed is 45 revolutions per minute and the mixing time is 200 seconds. The mixed material M1 is obtained by mixing evenly.

(4) First, ½ of water is mixed with all the superplasticizer, and then the mixed solution is added into the mixture M1. Then the remaining water is used to clean the container containing the superplasticizer. After cleaning, the remaining water is added to the mixture M1. After 200 seconds of mixing, the mixture M2 is obtained, and then the molding and curing are carried out according to Chinese national standards.

Embodiment 3

A strontium ferrite-based sacrificial mortar comprises the following components in parts by weight:

700 parts of sulphoaluminate cement, 300 parts of strontium ferrite, 600 parts of quartz sand, 400 parts of water and 35.0 parts of superplasticizer.

Preparation Method:

(1) Weighing required materials, including sulphoaluminate cement, strontium ferrite powder, quartz sand, tap water and superplasticizer.

(2) Wetting mixer and all necessary tools and moulds with water.

(3) The weighed sulphoaluminate cement, strontium ferrite powder and quartz sand are added to the forced single horizontal shaft concrete mixer in turn. The mixing speed is 45 revolutions per minute and the mixing time is 200 seconds. The mixed material M1 is obtained by mixing evenly.

(4) First, ½ of water is mixed with all the superplasticizer, and then the mixed solution is added into the mixture M1. Then the remaining water is used to clean the container containing the superplasticizer. After cleaning, the remaining water is added to the mixture M1. After 200 seconds of mixing, the mixture M2 is obtained, and then the molding and curing are carried out according to Chinese national standards.

The above three embodiments have the same preparation process. The differences are as follows: 900 parts of sulphoaluminate cement and 100 parts of strontium ferrite in Embodiment 1. 800 parts of sulphoaluminate cement and 200 parts of strontium ferrite in Embodiment 2. 700 parts of sulphoaluminate cement and 300 parts of strontium ferrite in Embodiment 3. The sum of the mass of sulphoaluminate cement and strontium ferrite in the three embodiments is 1000 parts, while the mass of strontium ferrite in the three embodiments increases in turn. The quartz sand in all three embodiments was 600 parts and the water in all three embodiments was 400 parts, which remained unchanged. In order to make the prepared strontium ferrite-based sacrificial mortar achieve the required working performance, the dosage of superplasticizer in the three embodiments is very different.

Performance Testing

According to Chinese national standard GB/T 14902-2012, the working performance of the strontium ferrite-based sacrificial mortar in the above embodiments was tested, and the measurement index was slump flow. According to Chinese national standard GB/T 50107-2010, the 28-day compressive strength of strontium ferrite-based sacrificial mortar was tested. The enthalpy of strontium ferrite-based sacrificial mortar was tested by thermogravimetric analysis, and the decomposition temperature was tested by high temperature experiment. The decomposition enthalpy of strontium ferrite-based sacrificial mortar was obtained by combining the two experiments. The experimental results of the three embodiments are shown in Table 1.

TABLE 1

Experimental results

| Embodiments | Slump flow (mm) | 28-day compressive strength (MPa) | Decomposition enthalpy (J/kg) |
|---|---|---|---|
| Embodiment 1 | 253 | 45.3 | 509.9 |
| Embodiment 2 | 249 | 40.4 | 572.9 |
| Embodiment 3 | 252 | 37.1 | 627.7 |

It can be seen from Table 1 that the slump flow of the three embodiments is greater than 245 mm, which meets the requirements of self-compacting performance. With the increase of strontium ferrite content, the 28-day compressive strength of strontium ferrite-based sacrificial mortar gradually decreases, but the minimum strength is 37.1 MPa, which is still 23.67% higher than the technical requirement of 30 MPa. With the increase of strontium ferrite content, the decomposition enthalpy of strontium ferrite-based sacrificial mortar gradually increases, which indicates that the corrosion rate gradually decreases, thus improving the safety of nuclear power plants.

In addition, it should be noted that the above embodiments are only used to illustrate the technical scheme of the present invention. If the technical embodiment of the present invention is modified or replaced by an ordinary technician in the technical field without departing from the purpose of the present invention, it shall be covered in the protection scope of the claims of the present invention.

The following explains why the decomposition enthalpy of strontium ferrite-based sacrificial mortar increases, which leads to the decrease of its corrosion rate:

According to the heat conduction theory, the relationship between the erosion rate of strontium ferrite-based sacrificial mortar and the heat flux transferred to its interior is shown in the following formula:

$$V = Q/(\rho \times A \times \Delta H) \quad (1)$$

In the above formula, V is the erosion rate of strontium ferrite-based sacrificial mortar, Q is the heat flux transferred to the interior of strontium ferrite-based sacrificial mortar, A is the erosion area of strontium ferrite-based sacrificial mortar, and ΔH is the decomposition enthalpy of strontium ferrite-based sacrificial mortar.

It can be seen from the above formula (1) that the erosion rate of strontium ferrite-based sacrificial mortar is inversely proportional to its decomposition enthalpy. This indicates that when the decomposition enthalpy of strontium ferrite-based sacrificial mortar increases, the corrosion rate decreases.

The invention claimed is:

1. A strontium ferrite-based sacrificial mortar, comprising the following raw materials in parts by weight:
   720-1000 parts of sulphoaluminate cement, 100-300 parts of strontium ferrite, 600-650 parts of quartz sand, 400-450 parts of water and 0.01-35 parts of superplasticizer;
   wherein the cement is sulphoaluminate cement of grade 42.5, with CaO in a mass content of larger than 40%, and $Al_2O_3$ in a mass content of greater than 20%;
   the quartz sand is a high-quality quartz powder, with $SiO_2$ mass content greater than or equal to 99%, and a particle size distribution of 0.075 mm-4.75 mm;
   the superplasticizer is polycarboxylic acid superplasticizer, with a colorless to light yellow appearance, a density of 1.05-1.15 g/mL, a solid content greater than or equal to 40% (mass content), a gas content of 6%-8% (volume content), a pH of 6-8, and a water reducing rate greater than or equal to 33%;
   a preparation method comprising the steps as follows:
   (1) mixing sulphoaluminate cement of 42.5 grade, strontium ferrite powder and quartz sand to obtain a mixed material M1 after uniformly dry mixing; and
   (2) adding a mixed solution of water and superplasticizer into the uniformly mixed material M1, and stirring to obtain a uniformly mixed material M2, then obtaining the strontium ferrite-based sacrificial mortar;
   in step (1), the raw materials for mixing are added into a single-shaft horizontal forced concrete mixer, with a mixing speed of 40-50 revolutions/min, a mixing duration of 200-240 seconds; and in step (2), ½ of the water is firstly mixed with all the superplasticizer to develop a uniformly mixed solution by uniformly mixing, and adding the uniformly mixed solution into the mixed material M1, then a remaining water is used to wash a container holding the superplasticizer, and the remaining water used for washing is added into the mixed material M1, followed by mixing for a duration of 200-240 seconds.

2. The strontium ferrite-based sacrificial mortar as claimed in claim 1, wherein the strontium ferrite is in a form of powder with $SrFe_{12}O_{19}$ in a mass content of greater or equal to 95%.

3. The strontium ferrite-based sacrificial mortar as claimed in claim 1, wherein the water is tap water or drinking water, in line with requirements of Standard of Water for Concrete (JGJ 63-2006).

* * * * *